United States Patent [19]
Rymut et al.

[11] Patent Number: 5,150,615
[45] Date of Patent: Sep. 29, 1992

[54] LIQUID LEVEL SENSOR

[75] Inventors: Michael J. Rymut, Cadillac; Stephen R. W. Cooper, Tustin; John M. Washeleski, Reed City, all of Mich.

[73] Assignee: Nartron Corporation, Read City, Mich.

[21] Appl. No.: 742,272

[22] Filed: Aug. 7, 1991

Related U.S. Application Data

[63] Continuation of Ser. No. 643,536, Jan. 18, 1991, abandoned.

[51] Int. Cl.$^5$ .................. G01D 5/20; G01F 23/62
[52] U.S. Cl. ................. 73/313; 73/DIG. 5; 324/207.17
[58] Field of Search .................. 73/313, DIG. 5; 336/183; 324/207.17

[56]  References Cited

U.S. PATENT DOCUMENTS

| | | | |
|---|---|---|---|
| 3,495,456 | 2/1970 | Ohno | 336/30 |
| 4,556,886 | 12/1985 | Shimizu et al. | 324/207.17 X |
| 4,627,280 | 12/1986 | Hayashi et al. | 336/183 |
| 4,771,804 | 9/1988 | Morales | 73/313 X |
| 4,833,919 | 5/1989 | Saito et al. | 73/DIG. 5 |

FOREIGN PATENT DOCUMENTS

| | | |
|---|---|---|
| 2914083 | 10/1979 | Fed. Rep. of Germany . |
| 3603950 | 8/1987 | Fed. Rep. of Germany . |
| 2021770 | 12/1979 | United Kingdom . |

Primary Examiner—Daniel M. Yasich
Attorney, Agent, or Firm—Watts, Hoffmann, Fisher & Heinke Co.

[57]  ABSTRACT

A fuel sensing and monitoring apparatus and method is disclosed. The apparatus includes two spaced conductive coils constituting a primary and secondary winding of a transformer. A short coupling member is mounted to a movable member to which a float is attached, the float being located in the fuel tank of a vehicle. The float and movable member move in response to a change in fuel level in the tank. When the fuel level changes, the short coupling member moves relative to the primary and secondary windings. This movement adjusts or alters the transformer coupling between the primary and secondary and produces a variable output signal which can be correlated, through the use of appropriate circuitry, to a representation of the level or fuel in the tank as indicated by the position of the movable member to which the float is attached.

13 Claims, 5 Drawing Sheets

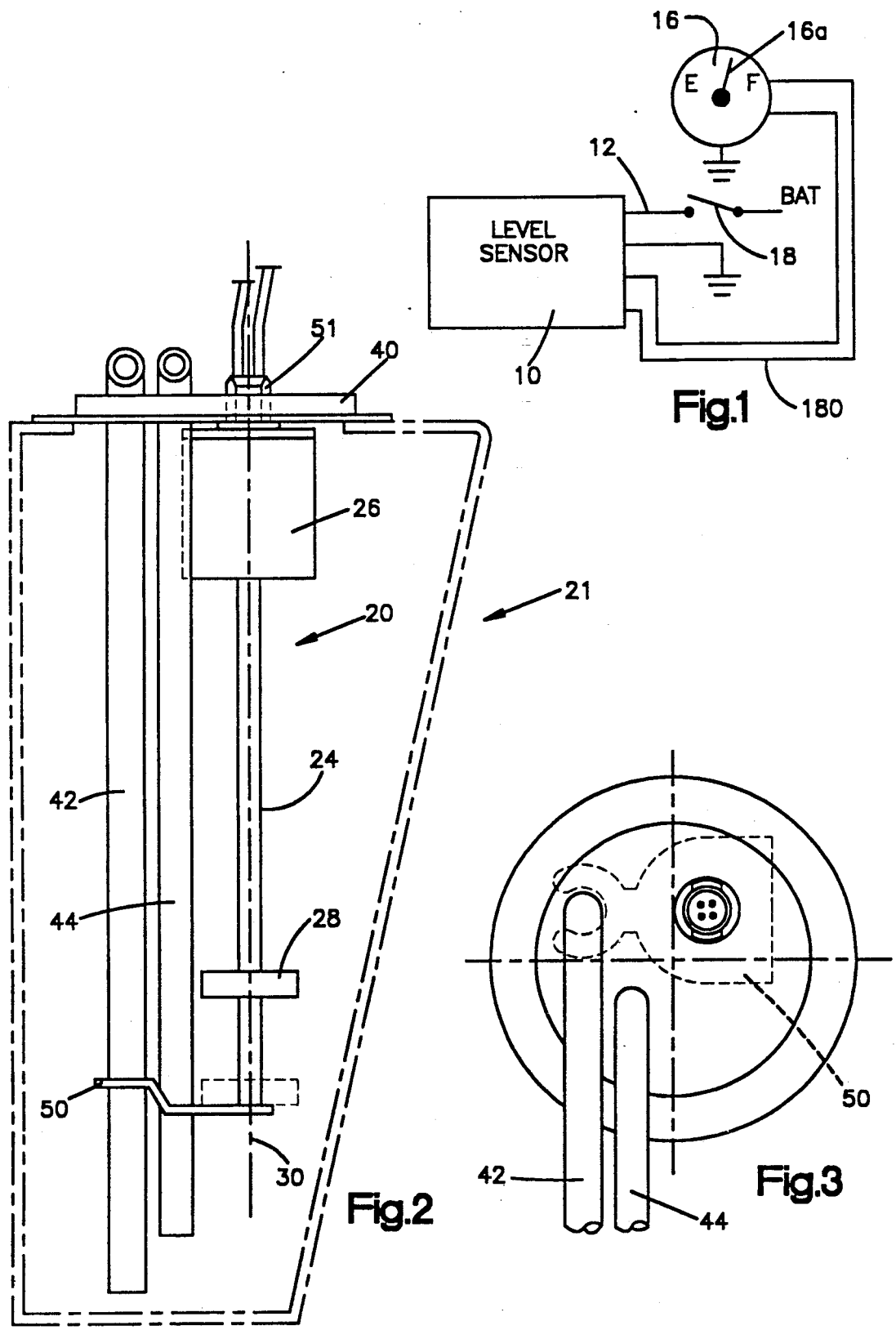

LIQUID LEVEL SENSOR

RELATED APPLICATIONS

This application is a continuation of U.S. Pat. application Ser. No. 07/643,536, filed Jan. 18, 1991 now abandoned.

FIELD OF THE INVENTION

The present invention concerns a level sensor for monitoring a fluid level in a container and more specifically concerns a fuel level sensor for a vehicle fuel tank.

BACKGROUND ART

Fuel level sensors that are known to applicants for monitoring the level of fuel within a gas tank are accurate only when the gas tank has a uniform width and height. This is because existing fuel level sensors approximate the fuel level by assuming a linear relationship between fuel volume and fuel level. Many existing gas tanks, however, do not result in such a linear relationship. To modify existing fuel level sensors to accurately sense fuel levels would, it is believed, require elaborate compensation electronics. This is perceived to be prohibited due to the cost required. Therefore conventional fuel level sensors typically sacrifice accuracy due to the cost in improving that accuracy.

Known conventional fuel level sensors use an arm having a float attached at one end. An opposite end of the arm is connected to a rotary potentiometer that provides a resistance which varies linearly with the position of the potentiometer contact. As the arm moves in response to motion of the float, the resistance of the potentiometer changes and an electrical signal output is generated. The geometry of such an arrangement can make proper installation and alignment of the fuel level sensor difficult. Additionally, the rotary potentiometer used with prior art devices is quite limited in its resolution due to the electromechanical nature of its operation. This device is also subject to wear with use and can be more easily contaminated due to its reliance on moving parts.

DISCLOSURE OF THE INVENTION

The present invention concerns an easy to install, reliable, and accurate level sensor. One embodiment of the invention concerns a fuel level sensor. Output data from a sensor constructed in accordance with the invention provide continuous resolution and can be used to accurately measure a liquid level even in an irregularly shaped container.

A level sensor constructed in accordance with the invention includes an elongated probe adapted for insertion into a fluid container. Side-by-side primary and secondary transformer coils are spaced apart parallel to each other and are wound around first and second coil forms that are insulated from contact with fluid in the container by a probe housing. A fluid level float positioned within the container moves along a travel path as the fluid level changes. The float includes a coupling material that alters the transformer coupling between the primary and secondary transformer coils of the probe. As the fluid level changes within the container, the float moves along its travel path and modifies the transformer coupling. This allows sensing circuitry that excites the primary and monitors an output from the secondary to produce a signal indicative of the fluid level within the container.

The primary and secondary coils constitute current carrying wires wound around a mandrel or core. The turn spacing between adjacent coils can be adjusted to produce a profile that varies with the position of the float. In this way, irregularities due to the shape of the container can be taken into account electronically rather than accepting inaccuracies due to irregular container shape.

The elongated probe housing forms a generally cylindrical structure and the float is an annulus that fits over the cylindrical housing of the probe. The primary and secondary coils are constructed as generally depicted in pending U.S. Pat. application Ser. No. 07/296,183 to Ko al which was filed Jan. 11 1989. The disclosure of this pending United States patent application is incorporated herein by reference.

The electronics for activating the transformer primary and responding to outputs from the transformer secondary is mounted in an enclosed module supported within the container. The resulting structure can be easily mounted within the container and since there is no moving arm/potentiometer combination, inaccuracies due to the mounting of the structure can be reduced.

Other objects, advantages and features of the invention will become better understood from a detailed description of the preferred embodiment of the invention which is described in conjunction with the accompanying drawings.

BRIEF DESCRIPTION OF THE DRAWINGS

FIG. 1 is a circuit schematic showing a fluid level sensor coupled to an analog meter and energized by a motor vehicle battery;

FIG. 2 is an elevation view of an elongated probe and fuel inlet and outlet mounted to a common support;

FIG. 3 is a plan view of the support shown in FIG. 2;

BEST MODE FOR CARRYING OUT THE INVENTION

Figure 4:
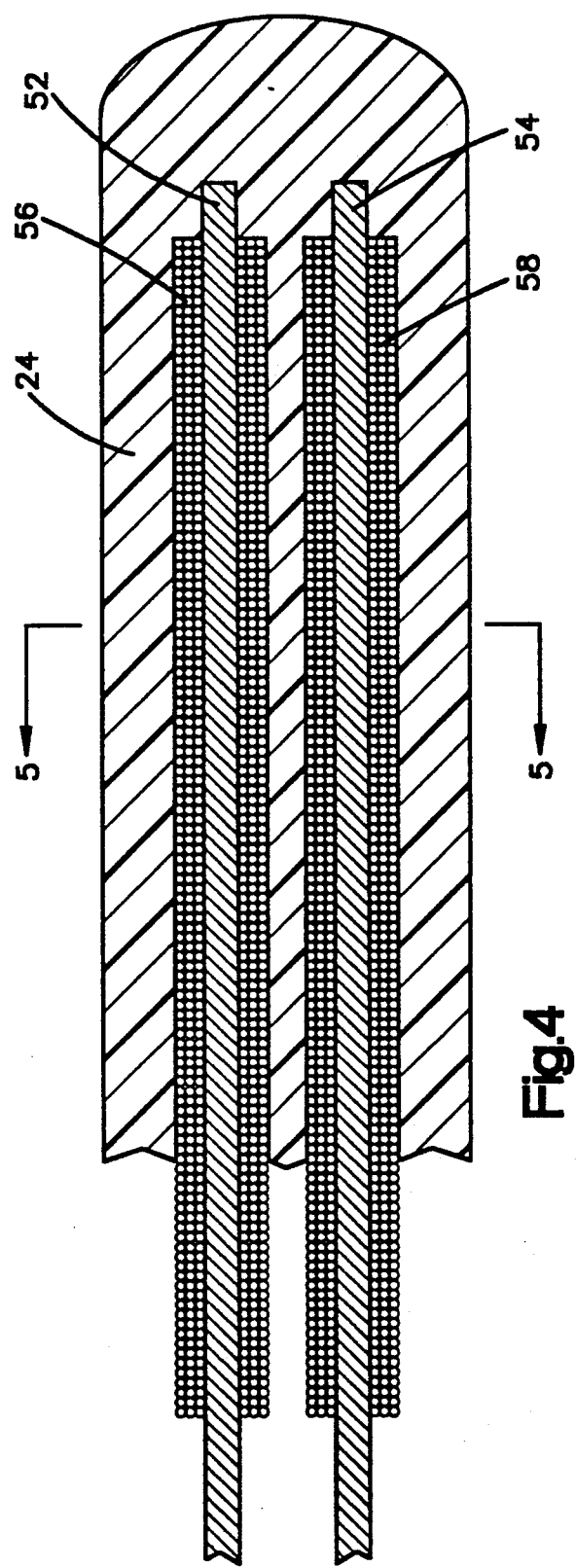
FIG. 4 is a section view of an end portion of the elongated probe.
Figure 5:
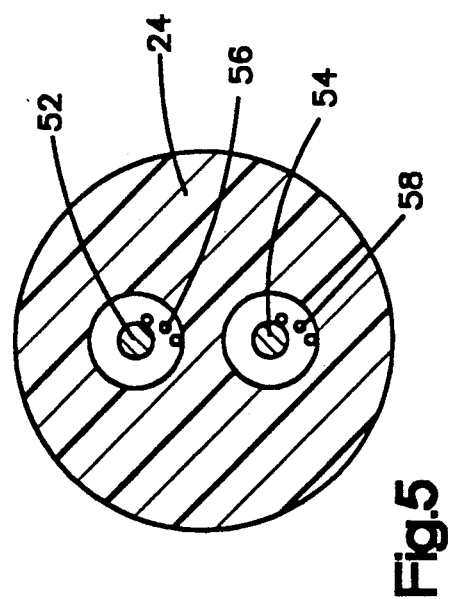
FIG. 5 is a section view as seen from the plane defined by the line 5—5 in FIG. 4.

Turning now to the drawings, a level sensor 10 is energized by a battery input 12 and provides an electrical signal that is coupled to a fluid level meter 16. A typical and preferred application of the invention is for monitoring fuel level within a fuel tank. Thus, the battery is a conventional motor vehicle battery providing a 12 volt signal. Upon closure of an ignition switch 18, level sensing electronics within the sensor 10 are activated and an output signal corresponding to the level of fuel within the motor vehicle fuel tank is provided.

FIG. 2 depicts a sensor assembly 20 that is inserted into a fuel container 21 for monitoring fuel level within the container. The container 21 is depicted as being irregularly shaped to correspond to one of many irregular fuel tank configurations encountered on motor vehicles. The assembly 20 includes an elongated probe housing 24 coupled to a circuit housing 26, and a fuel level float 28 which moves along a travel path generally parallel to a center axis 30 of the probe housing 24.

The float 28 is constructed from a buoyant material which floats on the fluid so that in a fuel level sensing application of the invention the float 28 floats on the fuel in the fuel tank. As the level of fuel drops within the tank, the float 28 falls to a level such as that depicted in FIG. 2. The phantom position of the float shown in FIG. 2 illustrates the absolute minimum fuel level and when the float falls to this level, the meter pointer 16a points to the "E" indicating the fuel container is empty.

The assembly 20 includes a generally circular support plate 40 which supports the electronics housing 26 within the container. In one typical application of the invention, the maximum level fuel rises within the container is just beneath the bottommost surface of the electronic housing 26.

Fuel is delivered to the fuel tank through a metal inlet tube 42 which is routed through an opening in the plate 40. Fuel is withdrawn from the tank through a metal outlet tube 44 which is of a generally similar shape to the inlet tube 42 but extends a shorter distance into the fuel container. A bottommost portion of the probe housing 24 is coupled to the inlet tube 42 by a metal clip 50 that engages the conduit 42 at one end and traps the float from falling off the end of the housing 24. An opposite end of the clip 50 is physically connected to the probe housing 24 and adds structural rigidity to the assembly 20.

During fuel tank assembly, the sensor assembly 20 is routed into an appropriately configured opening in the fuel tank and secured in place by welding or suitable connectors. A gasket or seal positioned between the fuel tank and the plate 40 prevents fuel from leaking at the interface between the plate and the edge of the fuel tank opening into which the assembly 20 is inserted. An electrical connector 51 couples four inputs to the assembly 20 corresponding to a 12 volt, ground, and two signals that are routed to the meter 16.

FIG. 4 shows in greater detail a sectioned view of the probe housing 24. The probe housing is preferably constructed from plastic and is injected molded. A pair of generally cylindrical metallic supports 52, 54 are spaced apart parallel to each other and support a primary 56 and secondary 58 transformer winding. Further details concerning the construction of this probe-housing 24 are disclosed in pending U.S. Pat. application 07/296,183 to Ko et al. As the float 28 moves along a travel path generally parallel to the axis of the probe housing 24, it enhances the transformer coupling between the primary and secondary windings to an extent which is dependent upon the position of the float.

The float 28 includes an inner ring of high conductivity coupling material fixed on the inside diameter of a buoyant collar of low density having a high chemical resistance. The metal supports 52, 54 are preferably constructed using 0.05 inch diameter 4140 welding rod. These rods are preferably insulated using 0.004 inch thick polyethylene coating. The primary and secondary coils are wound using 43 gauge solderable polyester coated magnet wire covered with a protective polyurethane coating. The housing 24 is constructed of a material which provides a wide range of chemical resistance and is preferably 30% glass reinforced polyester. The disclosed housing 24 is preferably molded into right and left halves having elongated grooves into which the coils 56, 58 fit.

As more fully disclosed in the aformentioned U.S. patent Application Ser. No. 07/296,183 to Ko et al., excitation of the primary winding 56 induces a radially looping current in the inner ring of coupling material on the float 28. In turn, the looping current in float 28 causes a voltage to be induced in secondary winding 58. The magnitude of the looping current in the inner ring and the voltage induced in secondary winding 58 increases are dependent on the winding densities in the primary and secondary coils 56, 58. Essentially no coupling occurs between the portions of the primary and secondary windings 56, 58 which are not within the float 28. The coupling material may be a nonferrous material such as aluminum.

Figure 8:
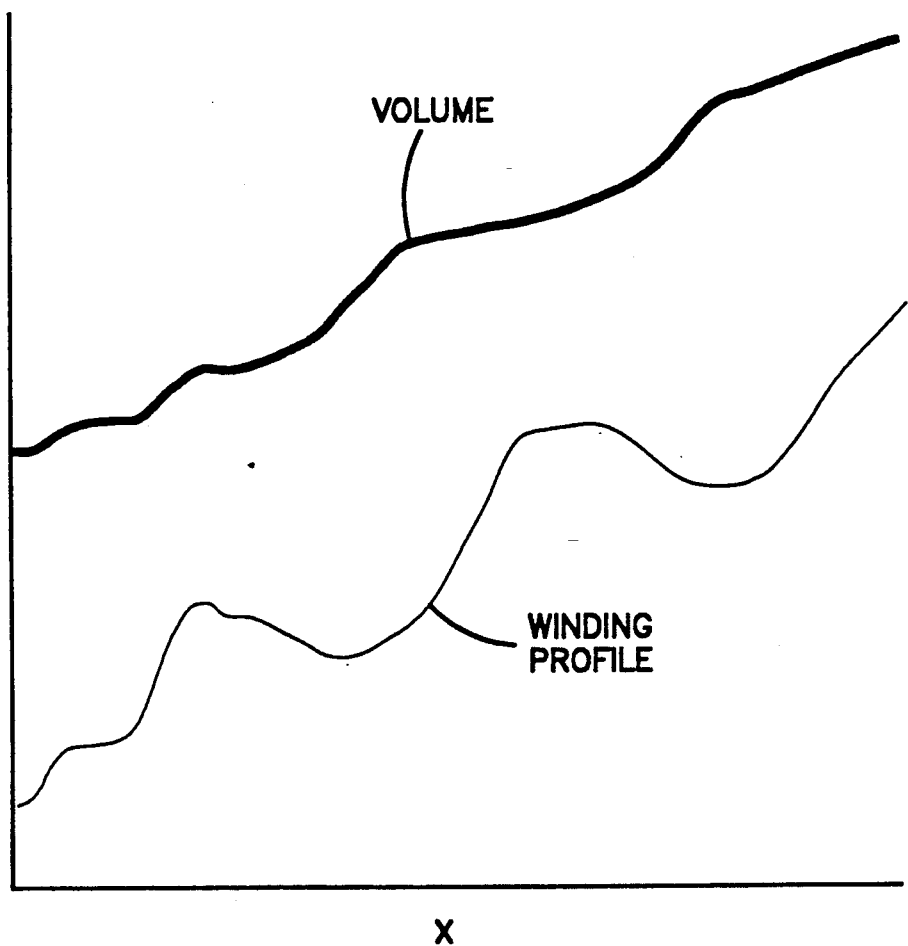
FIG. 8 is a graph comparing the change in volume of an irregularly shaped fuel container along the travel path "x" of the float (that is, the shape of the container along the travel path) with the winding profile of the primary coil of a sensor adapted for use in such a container.

The coils 56, 58 are wound in a manner which results in a non-uniform winding density. The density at any given point of the coils 56, 58 corresponds to the shape at that point of the fuel container 21. The present invention thereby allows for a "customizable" output versus position of the float 28 that is achieved directly in the sensor assembly 20. As shown in FIG. 8, the coil winding profile "W(x)" (among other design parameters) is varied along the sensor's length in such a way as to achieve a given "V(x) versus x" relationship. The appropriate design parameters such as "W(x)" are determined by computer modeling. The computer modeling uses well known physical and mathematical principles. Commercially available electromagnetic FEA packages can enable one "skilled in the art" (physics, electrical engineering) to determine appropriate design parameters for a given "V(x) versus X" output response.

Figure 6:
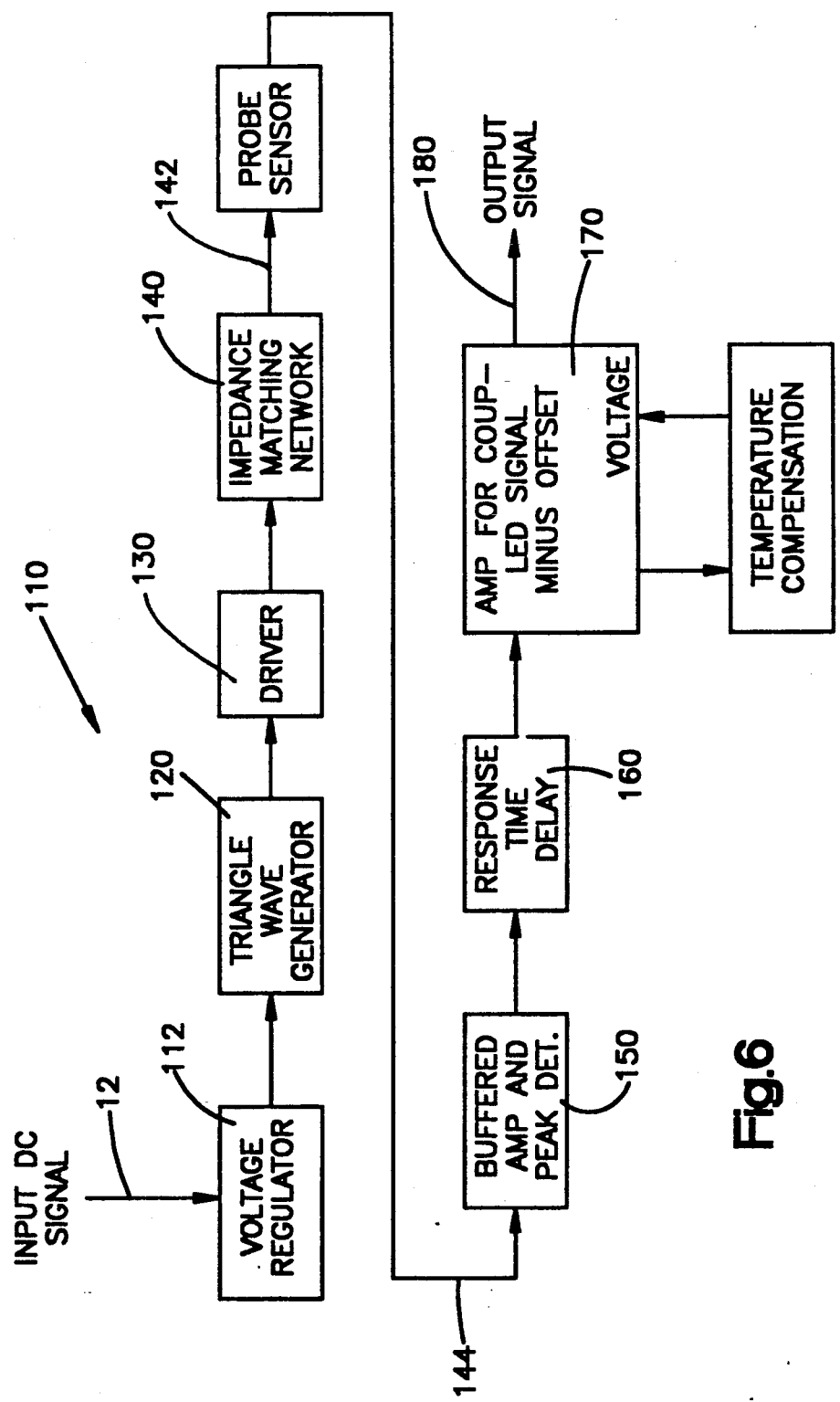
FIG. 6 is a schematic overview of circuitry for energizing and monitoring an output from the elongated probe.
Figure 7:
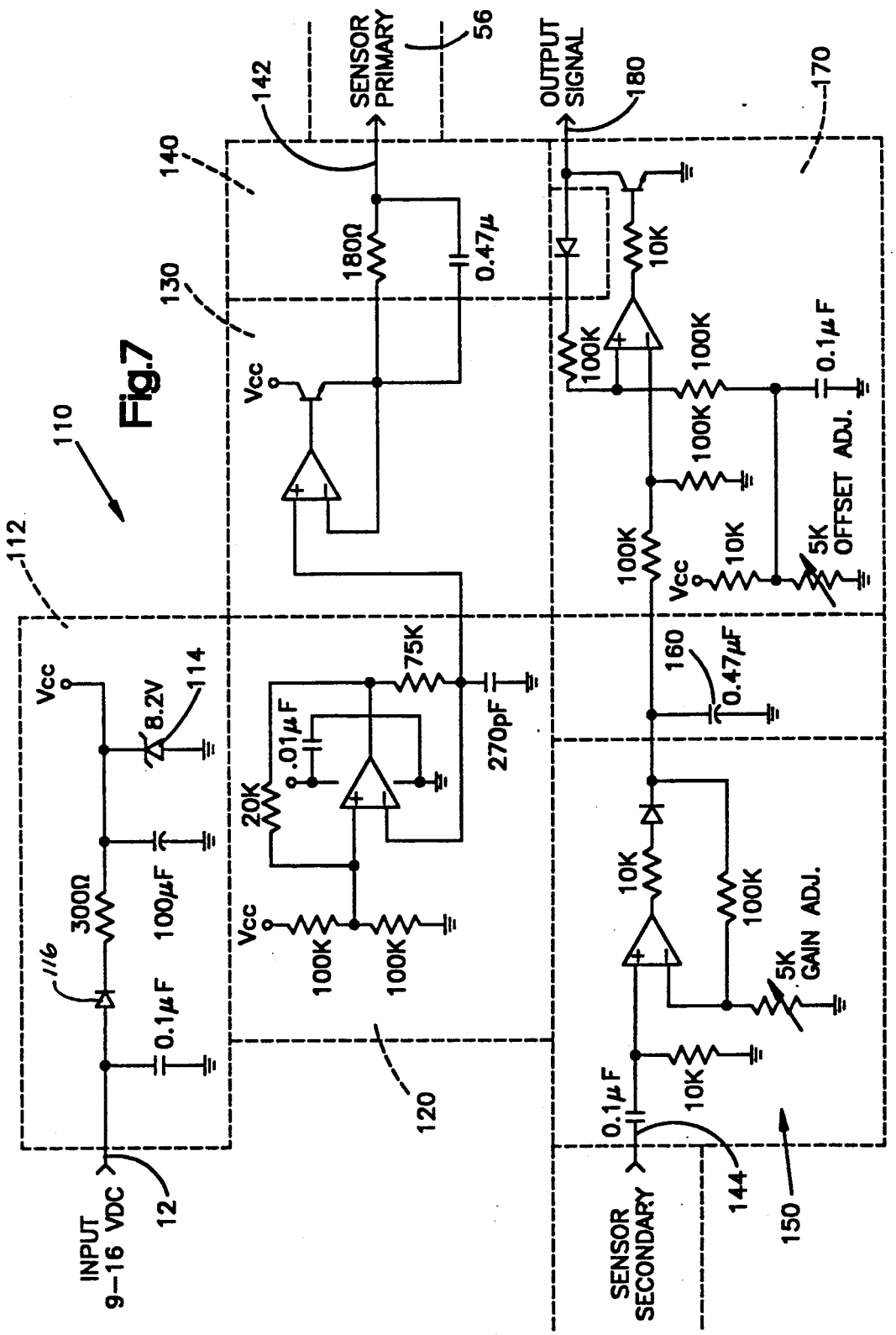
FIG. 7 is a detailed schematic of circuitry for energizing the primary coil and responding to output signals from the secondary coil.

FIGS. 6 and 7 disclose a circuit 110 for activating the primary winding and responding to outputs from the secondary winding. The 12 volt battery input 12 is connected to a voltage regulator 112 which provides a regulated supply of voltage $V_{CC}$. The circuit 112 includes a zener diode 114 for protecting against overvoltages and a diode 116 for inhibiting voltage transients from the circuit.

A triangle wave generator 120 powered by the regulated voltage $V_{CC}$ provides a 7.8 khertz signal which is amplified by a driver circuit 130 and coupled to an impedance matching circuit 140. The 7.8 kilohertz signal at an output 142 from the impedance matching circuit is coupled to the sensor primary coil 56.

An alternating current signal whose amplitude is related to the position of the float 28 is output from the probe secondary 58 and coupled as an input 144 to a peak detector circuit 150. The peak detector circuit provides a DC voltage which is proportional to the amplitude of the signal from the secondary winding. A capacitor 160 provides a time delay to average the amplitude thereby minimizing the effect of random fluid motion within the container 21. An amplifier 170 provides an output 180 to the meter 16 that is corrected to compensate for variations introduced by component tolerances and ambient temperature. A factory adjustable offset potentiometer allows the amplifier circuit 170 to be set before the circuit 110 is potted within the housing 26.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. A fuel level sensor comprising:
   a) an elongated probe adapted for insertion into a fuel container including side by side primary and secondary transformer coils wound around first and second coil forms insulated from contact with fuel in the fuel container by an elongated probe housing;
   b) a fuel level float positioned within the fuel container for movement along a travel path as the fuel level changes with fuel consumption; said fuel level float including a coupling material that alters the transformer coupling between the primary and secondary transformer coils of said elongated probe as the fuel level float moves along the travel path; and
   c) sensing circuitry for exciting the primary transformer coils with an excitation signal and evaluating a position of the fuel level float along said travel path from an output signal from the secondary transformer coil.

2. The fuel level sensor of claim 1 wherein the elongated probe housing forms a generally cylindrical housing and wherein the fuel level float is an annulus that fits over the cylindrical housing and moves along the cylindrical housing as the fuel level changes.

3. The fuel level sensor of claim 1 wherein the sensing circuitry comprises an alternating current source coupled to the primary transformer coils and an output monitoring circuit coupled to the secondary transformer coils and wherein both the alternating current source and the monitoring circuit are supported within a circuit housing positioned inside the fuel container.

4. The fuel level sensor of claim 1 wherein the winding density along the primary and/or secondary transformer coils is non-uniform to take into account the shape of the fuel container.

5. A fluid level sensor comprising:
   a) an elongated probe adapted for insertion into a fluid container including side by side primary and secondary transformer coils wound around first and second coil forms insulated from contact with fluid in the fluid container by an elongated probe housing;
   b) a fluid level float positioned within the fluid container for movement along a travel path as the fluid level changes; said fluid level float including a coupling material that alters the transformer coupling between the primary and secondary transformer coils of said elongated probe as the fluid level float moves along the travel path; and
   c) sensing circuitry for exciting the primary transformer coils with an excitation signal and evaluating a position of the fluid level float along said travel path from an output signal from the secondary transformer coil.

6. The fluid level sensor of claim 5 wherein the elongated probe housing forms a generally cylindrical housing and wherein the fluid level float is an annulus that fits over the cylindrical housing and moves along the cylindrical housing as the fluid level changes.

7. The fluid level sensor of claim 5 wherein the sensing circuitry comprises an alternating current source coupled to the primary transformer coils and an output monitoring circuit coupled to the secondary transformer coils and wherein both the alternating current source and the monitoring circuit are supported with an electronic housing positioned inside the fluid container.

8. The fluid level sensor of claim 5 wherein the winding density along the primary and/or secondary transformer coils is non-uniform to take into account the shape of the fuel container.

9. A fluid level sensor comprising:
   a) an elongated probe adapted for insertion into a fluid container including side by side primary and secondary transformer coils wound in a non-uniform density around first and second coil forms insulated from contact with fluid in the fluid container by an elongated probe housing, said elongated probe housing forming a generally cylindrical housing;
   b) a fluid level float positioned within the fluid container for movement along a travel path as the fluid level changes wherein said fluid level float is an annulus that fits over the cylindrical housing and moves along the cylindrical housing as the fluid level changes, wherein said fluid level float also includes a coupling material that alters the transformer coupling between the primary and secondary transformer coils of said elongated probe as the fluid level float moves along the travel path; and
   c) sensing circuitry for exciting the primary transformer coils with an excitation signal and evaluating a position of the fluid level float along said travel path from an output signal from the secondary transformer coil, wherein said sensing circuitry comprises an alternating current source coupled to the primary transformer coils and an output monitoring circuit coupled to the secondary transformer coils and wherein both the alternating current source and the monitoring circuit are supported within a circuit housing positioned inside the fluid container.

10. A fluid level sensor for measuring a volume of fluid in an irregularly shaped fluid container comprising:
    a) an elongated probe adapted for insertion into said fluid container including parallel spaced primary and secondary transformer coils insulated from contact with fluid in said fluid container by an elongated probe housing;
    b) a fluid level float positioned within the fluid container for movement along a travel path as the fluid level changes; said fluid level float including a coupling material that alters the transformer coupling between the primary and secondary transformer coils of said elongated probe as the fluid level float moves along the travel path;
    c) at least one of said primary and secondary coils having a nonlinear winding density corresponding to the shape of the fluid container along said travel path; and
    d) sensing circuitry for exciting the primary transformer coils with an excitation signal and evaluating an output signal from the secondary transformer coil related to volume of fluid in the fluid container.

11. A fluid level sensor according to claim 10 wherein the primary and secondary coils are side by side.

12. A fluid level sensor for measuring a level of fluid in a fluid container comprising:
   a) an elongated probe adapted for insertion into said fluid container including parallel spaced primary and secondary transformer coils insulated from contact with fluid in said fluid container by an elongated probe housing;
   b) a fluid level float positioned within the fluid container for movement along a travel path as the fluid level changes; said fluid level float including a coupling material that alters the transformer coupling between the primary and secondary transformer coils of said elongated probe as the fluid level float moves along the travel path;
   c) said primary and secondary coils each comprising a continuous winding having a uniform sense; and
   d) sensing circuitry for exciting the primary transformer coils with an excitation signal and evaluating a position of the fluid level float along said travel path from an output signal from the secondary transformer coil.

13. A fluid level sensor according to claim 12 wherein the primary and secondary coils are side by side.

* * * * *